Patented May 12, 1942

2,282,602

UNITED STATES PATENT OFFICE 2,282,602

PROCESS FOR THE CONVERSION OF HYDROCARBONS

Harry E. Drennan, Whittenburg, Tex., assignor to Phillips Petroleum Company, a corporation of Delaware No Drawing. Application March 15, 1938, Serial No. 196,048

8 Claims. (Cl. 196—10)

The present invention relates to the conversion of olefins to hydrocarbons of higher molecular weight. More specifically, the present invention relates to the conversion of olefins to higher boiling hydrocarbons in the presence of certain catalysts.

Conversion of olefins to higher boiling hydrocarbons has been accomplished by employing certain conditions of temperature and pressure, either with or without certain catalysts. Several substances have been found to be active catalysts in promoting the conversion of olefins to higher boiling products. Advantages following the use of catalysts have been found to be lower operating temperatures and pressures, higher flow rates, higher yields or the production of more desired products with less undesired products.

According to the present invention, catalytic material composed of phosphorous pentoxide ($P_2O_5$) together with metallic oxides, suitably treated to form active catalysts, as will be hereinafter set forth, is employed to promote the conversion of olefins to higher boiling hydrocarbons, under relatively mild conditions and in good yield. This phosphorous pentoxide-metallic oxide catalyst is very effective in the conversion of normally gaseous olefins to normally liquid hydrocarbons, such as, but not confined to, those boiling within the gasoline range. Furthermore, when olefins are contacted with this phosphorous-pentoxide-metallic oxide catalyst under certain conditions set forth below, a motor fuel of high anti-knock characteristics may be produced. Motor fuels with a high octane number and lead susceptibility which can be leaded within the permissible concentration to provide fuels of 100 octane number, can be produced readily from normally gaseous olefins by the practice of the present invention. This feature of the present invention is of great importance because of the growing demand for 100 octane fuel for aviation purposes. Hydrogenation of the resulting fuel by any of the conventional processes will produce a fuel which meets certain of the army aviation fuel specifications in which 100 octane fuel is required.

Phosphorous pentoxide alone, or along with certain other materials, has been disclosed heretofore as a polymerization catalyst. In I. G. British patent, Serial No. 340,513, of 1931, it is stated that phosphorous pentoxide may be employed as a polymerization catalyst under temperatures ranging from 200° to 400° C. although preferably temperatures of more than 240° C. are employed. In U. S. Patent No. 2,055,415, to Maleshev, there is described the use of phosphorous pentoxide suspended in a water free mixture of organic substances such as unsaturated hydrocarbons, with the addition of a peptizing agent.

According to the present invention, phosphorous pentoxide ($P_2O_5$) may be combined with metallic oxide, preferably with the addition of a binder, to provide a very efficient catalyst which is substantially non-hygroscopic, is in the form of porous granules, and which exhibits high catalytic activity in the conversion of olefins to higher boiling products under certain conditions of temperature and pressure, as will be set forth herebelow. The catalyst prepared in accordance with this invention displays not merely any additive functions of the combined ingredients, but constitutes a new and highly effective catalytic material. It is much more effective than phosphorous pentoxide itself. The metallic oxides alone show very little or no catalytic activity in the polymerization of olefins and hence act as catalysts only when combined with phosphorous pentoxide in the manner described in the present specification.

In the preparation of the catalyst of this invention, phosphorous pentoxide and a metallic oxide, or a mixture of metallic oxides, are intermixed, preferably in a powdered state. A suitable binder, also in powdered state is incorporated in the mixture which is then heated to a temperature within the range of 600–800° F. in dry air. Care must be taken that any air present be dry, because of the high hygroscopic activity of phosphorous pentoxide. As the mixture approaches the above temperature range, evolution of heat takes place, thus indicating that some change of a chemical nature is occurring, possibly a reaction between the metallic oxide and phosphorous pentoxide with the production of a complex reaction product. Since I am not aware of the exact nature of this change, however, I do not wish to be limited by any theory herein advanced, but merely wish to state that some change does take place, either physical, chemical or both, which produces an active catalytic material from the relatively inactive mixture. I choose to refer to this treatment as a calcining operation, and wherever that term is used herein it is intended to mean the heat treatment of the phosphorous pentoxide metallic oxide mixture to produce an active catalyst in suitable form.

Phosphorous pentoxide ($P_2O_5$) should comprise a major portion of the catalyst mixture, with a minor portion of metallic oxide and a small amount of binder. In general, the metallic oxides which are suitable as constituents of the catalyst are the oxides of copper, magnesium, iron, zinc, aluminum, tin and nickel. It should be understood that these oxides are not of equal effectiveness when combined with phosphorous pentoxide to form a conversion catalyst. Copper and magnesium oxides are the most effective, with cuprous oxide exhibiting slightly more activity than the cupric oxide. Iron oxide is next in effectiveness, although it is less effective in the combined catalyst than copper and magnesium oxides. The other oxides are of about equal effectiveness.

Mixtures of the various metallic oxides when combined with phosphorous pentoxide provide very effective catalysts. One of the most effective catalysts in accordance with this invention is one containing a binder and a major proportion of phosphorous pentoxide and a minor proportion of brucite ($Mg(OH)_2$), which is dehydrated to the oxide on heating within the range previously specified, and cuprous oxide.

Various substances which yield a carbonaceous residue upon heating may be employed as a binder. Tar, asphalt, heavy petroleum oils, glue, starch sugar constitute efficient binders. Hydrocarbons, in the form of tars or asphalts or heavy oils, coke upon heating within the aforementioned temperature ranges, thus providing a catalyst of superior physical properties in the form of a hard, porous solid and for that reason are preferred.

A special procedure has been found to give best results in preparing catalysts employing materials which form coke, as binders. The oxide or mixtures of oxides are ground and added to the ground phosphorous pentoxide, care being taken to prevent moisture from coming in contact with the phosphorous pentoxide during the mixing. The hydrocarbon to be used as a binder is dissolved in gasoline and added to the phosphorous pentoxide-metallic oxide mixture and thoroughly stirred, a thick paste resulting. This paste is poured into shallow trays and is heated in an oven and brought to a temperature of approximately 550° F. in about two hours. The catalyst is then removed, cooled and crushed to pass a 4 mesh screen after which it is returned to the oven and heated to about 700° F. After cooling it is crushed and screened to the desired size. According to the present invention, it has been found that heating to 600 or 700° F. without removal from the oven causes the catalyst to fluff, with the result that a large portion will be soft and powdery. If it is cooled after heating to 550° F. and crushed, it will not fluff or soften upon subsequent heating to the desired temperature. The reason for this fluffing when the catalyst is heated suddenly to the desired temperature is not definitely known, although it is probably due to the rapid evolution of gases at above 550° F., which appears to be the temperature at which certain unknown reactions take place.

Catalysts prepared in the above manner will be found to be practically non-hygroscopic.

As previously stated phosphorous pentoxide should comprise the major constituent of the catalysts with relatively smaller amounts of a metallic oxide or mixtures of metallic oxides. The proportion of metallic oxides may be varied between 10 and 50 per cent, but the most efficient catalyst is obtained when the proportion of metallic oxide or mixture of oxides is held within the range of 15 to 35 per cent of the total ingredients. A very efficient mixture consists of phosphorous pentoxide 65% by weight, metallic oxide 25% by weight and binder 10% by weight. The proportion of metallic oxide materially effects the hygroscopic activity of the resultant catalyst. Too low a proportion of metallic oxide renders the catalyst hygroscopic and of low activity whereas too high a proportion results in a catalyst which is not as active as with the smaller proportions. The proportion of binder may be varied from approximately 3 to 20%.

The apparatus which may be employed in carrying out the process of the present invention may be very simple and need constitute no more than a conventional heating unit and a tower containing the catalyst. If desired, the tower may be heated directly.

Olefins suitable for conversion in accordance with this invention may be obtained from a variety of sources. In general any gas mixture containing olefins in suitable quantities may be employed. Dehydrogenation of saturated hydrocarbon gases and gases resulting from cracking operations are very suitable as charging stocks.

The gases containing polymerizable olefins will be contacted with one of the above described catalysts at a temperature generally within the range of 200–500° F. In most instances the preferred temperatures will fall within the range of 250 to 425° F. With the phosphorous pentoxide-copper oxide catalysts, temperatures of between 325 to 425° F. appear to be productive of optimum results, while the phosphorous pentoxide magnesium oxide catalyst appears to be of maximum effectiveness when the charging vapors are heated to within the range of 350 to 425° F. Specific temperatures which are most suitable for any one catalyst with specific pressures and charging stocks cannot, of course, be given. It will suffice to say that operation within the above disclosed temperature ranges will generally be satisfactory, the particular temperature to be employed under any specific set of conditions being readily determinable by trial.

Pressures may be varied over a wide range with satisfactory results. In general, pressures from as low as 100 pounds per square inch to several thousand pounds per square inch are effective, the particular pressure best suited for any set of operating conditions and for specific catalysts and charging stock varying, but being readily determinable by trial. For the most part, lower pressures may be employed with more active catalysts while higher pressures are necessary for maximum yields with less active catalysts. Under usual conditions and with suitable charging stock, pressures of 700 pounds per square inch or lower will be found suitable. Very satisfactory results have been obtained with pressures in the neighborhood of 200 pounds per square inch.

High flow rates may be employed in the process herein described. In general, flow rates of 100 barrels of liquid charging stock per hour, per ton of catalyst, may be used. Specific flow rates will vary over wide ranges, however, optimum rates for specific conditions being readily determinable by trial.

A feature of the present invention resides in the conditions of operation which will be productive of motor fuels with an octane number of 100 or thereabouts.

In general, the effective temperature range for the production of motor fuels having an octane rating of approximately 100, from mixtures of olefins in the presence of the phosphorous pentoxide-metallic oxide catalyst, will be 300 to 425°

F. at pressures ranging from 200 pounds per square inch to 3000 pounds per square inch. As the temperature is raised a corresponding raise in pressure is necessary for the production of motor fuel with a high octane rating. Optimum results were obtained with temperatures of between 350 to 375° F. and at pressures from 700 to 1000 pounds per square inch. Under these conditions approximately 95% of olefins in refinery gas containing 25% olefins were converted into motor fuel having an octane rating of 100 after hydrogenation and with the addition of 3 cc. of tetra ethyl lead per gallon of fuel.

The following tables set forth the characteristics of motor fuels of high octane number manufactured from vapor recovery gasoline containing 22% olefins under different conditions of temperature and pressure. The catalyst was composed of phosphorous pentoxide 65%, cuprous oxide 12.5%, brucite 12.5%, and tar 10%, prepared as above described. The flow rate in each instance was 100 barrels of liquid vapor recovery gases per hour per ton of catalyst.

Table I

| Operating pressure lb./sq. in | 200 | 700 | 2,000 |
|---|---|---|---|
| Temperature °F | 300 | 300 | 300 |
| Characteristics of resulting fuel: | | | |
| Gr. A. P. I | 61.1 | 64.2 | 64.7 |
| I. B. P | 100 | 98 | 92 |
| End point | 474 | 474 | 406 |
| At 206° F percent | 16 | 16 | 11 |
| Recovery do | 90 | 90 | 86 |
| Loss do | 9 | 9 | 13 |
| Octane number | | 88.8 | 89.1 |
| Octane number after hydrogenation +3 cc. tetraethyl lead | 100.3 | 101.4 | 101.7 |
| Approximate yield percent | 38 | 60 | 64 |

Table II

| Operating pressure lb./sq. in | 200 | 700 | 2,000 |
|---|---|---|---|
| Temperature °F | 350 | 350 | 350 |
| Characteristics of resulting fuel: | | | |
| Gr. A. P. I | 64.6 | 65.0 | 65.4 |
| I. B. P | 88 | 86 | 85 |
| End point | 492 | 476 | 446 |
| At 206° F percent | 26 | 26 | 27 |
| Recovery do | 85 | 86 | 87 |
| Loss do | 14 | 12 | 12 |
| Octane number | | 84.3 | 85.5 |
| Octane number after hydrogenation +3 cc. tetraethyl lead | 95.8 | 98.3 | 99.4 |
| Approximate yield percent | 68 | 90 | 98 |

Table III

| Operating pressure lb./sq. in | 200 | 700 | 2,000 |
|---|---|---|---|
| Temperature °F | 400 | 400 | 400 |
| Characteristics of resulting fuel: | | | |
| Gr. A. P. I | 65.3 | 65.6 | 66.5 |
| I. B. P | 86 | 88 | 90 |
| End point | 524 | 486 | 452 |
| At 206° F percent | 29 | 28 | 26 |
| Recovery do | 85 | 83 | 84 |
| Loss do | 14 | 16 | 15 |
| Octane number after hydrogenation | 79.6 | 80.3 | 82.8 |
| Octane number +3 cc. tetraethyl lead | 94.2 | 94.2 | 97.6 |
| Approximate yield percent | 64 | 90 | 98 |

Table IV

| Operating pressure lb./sq. in | 200 | 700 | 2,000 |
|---|---|---|---|
| Temperature °F | 425 | 425 | 425 |
| Characteristics of resulting fuel: | | | |
| Gr. A. P. I | 62.7 | 63.8 | 64.5 |
| I. B. P | 88 | 96 | 96 |
| End point | 546 | 504 | 466 |
| At 206° F percent | 28 | 26 | 26 |
| Recovery do | 88 | 86 | 87 |
| Loss do | 11 | 13 | 12 |
| Octane number after hydrogenation | 74.3 | 76.7 | 79.1 |
| Octane number +3 cc. tetraethyl lead | 89.0 | 91.2 | 93.5 |
| Approximate yield percent | 60 | 82 | 85 |

It should be noted that in each instance, increasing pressures resulted in products of lower end points which is contrary to the usual experience and appears to be a unique feature of the present invention.

The following examples will further illustrate the value of this invention, but the invention is not to be restricted thereby.

Example I

Refinery gases containing 27.7% olefins by weight constituted the charging stock. A pilot plant consisting of a catalyst tower filled with a catalyst prepared as previously described from a mixture of phosphorous pentoxide ($P_2O_5$) 70%, magnesium oxide (MgO) 25% and starch as a binder 5%. The charging stock was fed to the catalyst tower under a pressure of 3000 pounds per square inch and at a flow rate of 83 liquid barrels per hour per ton of catalyst. The catalyst tower was maintained at a temperature of 400° F. A conversion per pass of 70% by weight of the total olefins charged was obtained, the product boiling entirely within the gasoline range, below 408° F., and with an octane number of 86 which after hydrogenation and with the addition of 3 cc. of tetra ethyl lead was raised to 100+.

Example II

The same charging stock was fed to a catalyst tower under a pressure of 700 pounds per square inch and at a flow rate of 97 liquid barrels per hour per ton of catalyst. The catalyst tower was maintained at 350° F. A conversion per pass of 85.7% by weight of the total olefins charged was obtained, 83% of the olefins charged being converted to a liquid boiling within the gasoline range, with an octane number of 83 which after hydrogenation and the addition of 3 cc. of tetra ethyl lead was raised to 99.3. The catalyst used was prepared from a mixture of phosphorous pentoxide ($P_2O_5$) 65%, cuprous oxide 12.5%, brucite 12.5% and tar 10%.

Example III

The same charging stock as in the previous examples was fed to the catalyst tower containing the same catalyst as in Example II at a pressure of 2000 pounds per square inch and a flow rate of 114 liquid barrels of charging stock per hour per ton of catalyst. The tower was maintained at a temperature of 350° F. A conversion of 94% of the olefins charged to liquid products was obtained, 92% of the olefins charged being converted to liquids boiling within the gasoline range, with an octane number of 83.5 which after hydrogenation was raised to 85.5. Addition of 3 cc. of tetra ethyl lead raised the octane number to 99.4.

The following results were obtained with laboratory apparatus under low pressures but serve to indicate the relative effectiveness of the various catalysts. Isobutylene constituted the charge stock which was contacted with the various catalysts at a temperature of 360° F. and a pressure of 25 pounds per square inch absolute.

| Catalyst | Percent conversion | |
|---|---|---|
| | Gross | Net |
| $P_2O_5$ 70%; $Cu_2O$ 25%; binder 5% | 85 | 80 |
| $P_2O_5$ 70%; MgO 25%; binder 5% | 77 | 75 |
| $P_2O_5$ 65%; $Fe_2O_3$ 25%; tar 10% | 72 | 67 |
| $P_2O_5$ 70%; ZnO 25%; binder 5% | 48 | 44 |
| $P_2O_5$ 70%; $Al_2O_3$ 25%; binder 5% | 30 | 28 |
| $P_2O_5$ 70%; SnO 25%; binder 5% | 21 | 19 |
| $P_2O_5$ 70%; NiO 25%; binder 5% | 21 | 19 |

In the above table, gross is to be understood to mean total conversion of isobutylene to liquid products and net is the conversion of isobutylene to liquid products boiling within the gasoline range.

Having thus described my invention, I claim:

1. A process for the conversion of low molecular weight olefins to hydrocarbons of higher molecular weight which comprises contacting said olefins at conversion conditions of temperature and pressure with a catalyst comprising a moisture free mixture of phosphorous pentoxide and a metal oxide selected from the group consisting of the oxides of copper, magnesium, iron, zinc, aluminum, tin, and nickel, said mixture having been calcined under moisture-free conditions throughout the calcination with a binder which produces a carbonaceous residue upon heating, said catalyst being substantially non-hygroscopic and free from water.

2. A process for the conversion of low molecular weight olefins to hydrocarbons of higher molecular weight which comprises contacting said olefins at conversion conditions of temperature and pressure with a substantially non-hygroscopic and water-free catalyst comprising a moisture-free mixture of phosphorous pentoxide and a metal oxide selected from the group consisting of the oxides of copper, magnesium, iron, zinc, aluminum, tin, and nickel, said mixture having been calcined under moisture-free conditions throughout the calcination at a temperature of 600–800° F.

3. A process for the conversion of low molecular weight olefins to hydrocarbons of higher molecular weight which comprises contacting said olefins with a substantially non-hygroscopic and water-free catalyst characterized by its method of preparation which comprises heating a moisture-free mixture comprising a major portion of phosphorous pentoxide and a minor portion of a metallic oxide selected from the group consisting of the oxides of copper, magnesium, iron, zinc, aluminum, tin and nickel, together with a substance which leaves a carbonaceous residue upon heating, to a temperature within the range 600–800° F., said heating having taken place under moisture-free conditions throughout the heating period.

4. A process for the conversion of olefins to hydrocarbons of higher molecular weight which comprises contacting said olefins at conversion temperatures and pressures with a substantially non-hygroscopic and water-free catalyst characterized by its method of preparation which comprises heating under moisture-free conditions a mixture of a major proportion of phosphoric pentoxide and a minor proportion of a metal oxide selected from the group consisting of the oxides of copper, magnesium, iron, zinc, aluminum, tin and nickel together with a coke-forming hydrocarbon to a temperature sufficient to form a hard, porous catalytic material in which the phosphorous pentoxide and the metal oxide are intimately bound with coke.

5. A process for the conversion of low molecular weight olefins to hydrocarbons of higher molecular weight which comprises contacting said olefins at a temperature of 200–500° F. and a pressure of 200–3000 pounds per square inch with a catalyst comprising a moisture-free mixture of phosphorous pentoxide and a metal oxide selected from the group consisting of oxides of copper, magnesium, iron, zinc, aluminum, tin, and nickel, said mixture having been calcined under moisture-free conditions throughout the calcination with a binder which produces a carbonaceous residue upon heating, said catalyst being substantially non-hygroscopic and free from water.

6. A process for the conversion of low molecular weight olefins to hydrocarbons of higher molecular weight which comprises contacting said olefins with a catalyst characterized by its method of preparation which comprises heating a mixture comprising a major portion of phosphorous pentoxide and a minor portion of a metallic oxide selected from the group consisting of the oxides of copper, magnesium, iron, zinc, aluminum, tin and nickel, together with a hydrocarbon material capable of coking upon heating, to a temperature of approximately 550° F., cooling said mixture, and then gradually reheating the same to a temperature of approximately 700° F.

7. A process for the conversion of olefins to higher boiling hydrocarbons which comprises contacting said olefins with a catalyst comprising a calcined mixture of phosphorous pentoxide, an oxide of copper and magnesium oxide, at a temperature within the range 200–500° F. and under superatmospheric pressure.

8. A process for the conversion of normally gaseous olefins to liquid motor fuels of high octane rating, which comprises contacting said olefins with a catalyst comprising a calcined mixture of a major proportion of phosphorous pentoxide and a minor proportion of cuprous oxide and magnesium oxide at a temperature within the range 300 to 425° F. and at a corresponding pressure within the range 200 to 3000 pounds per square inch.

HARRY E. DRENNAN.